Dec. 23, 1958
J. J. HAWKINS ET AL
2,865,818
PROCESSING OF ALCOHOLS
Filed June 13, 1955
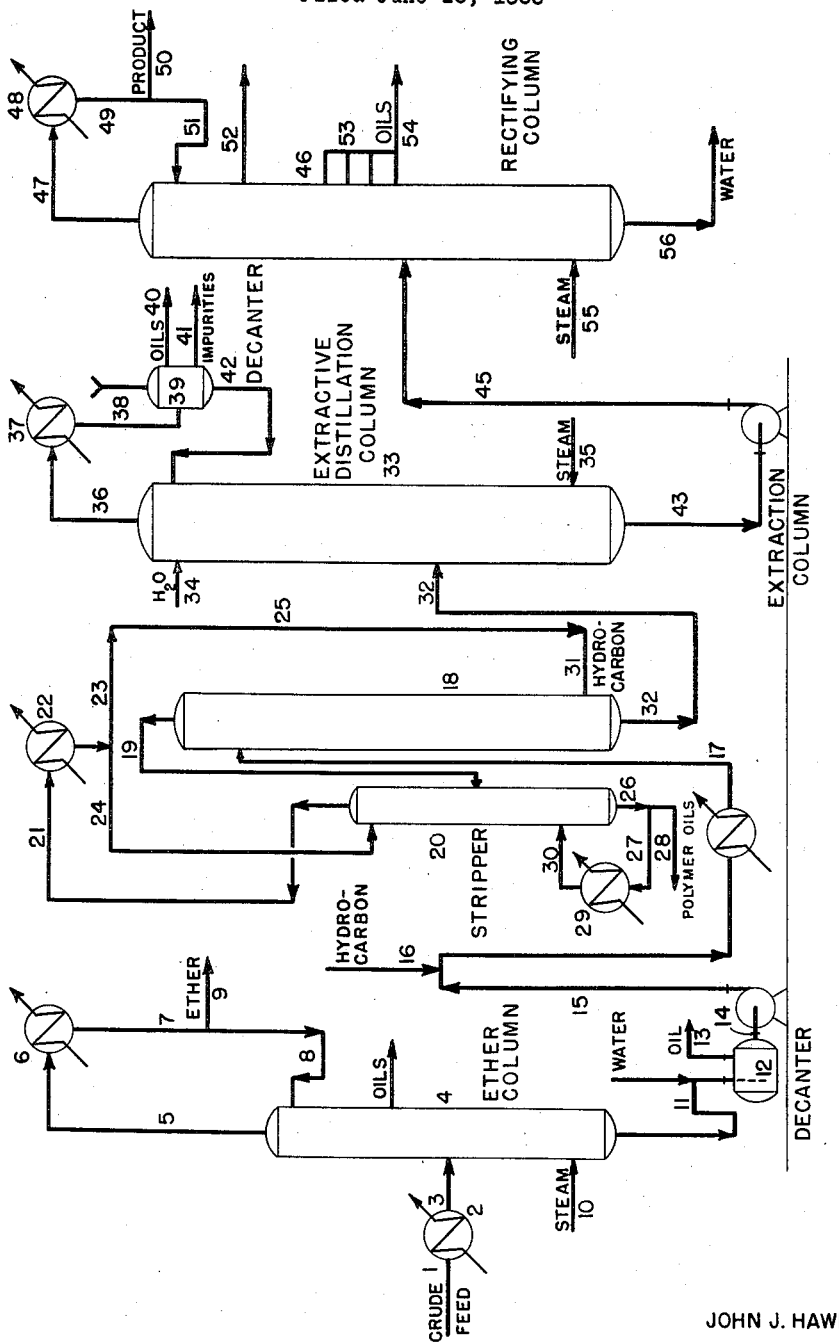
JOHN J. HAWKINS
FRANKLYN D. MILLER
*INVENTOR.*
BY *E. J. Berry*

United States Patent Office 2,865,818
Patented Dec. 23, 1958

2,865,818

PROCESSING OF ALCOHOLS

John J. Hawkins, Champaign, Ill., and Franklyn D. Miller, Cincinnati, Ohio, assignors to National Petro-Chemicals Corporation, New York, N. Y., a corporation of Delaware Application June 13, 1955, Serial No. 515,184

1 Claim. (Cl. 202—39.5)

This invention relates generally to a novel process for the refining and purification of crude aliphatic alcohols produced by the hydration of mono-olefins. More specifically, this invention relates to a process whereby an impure alcohol produced by the hydration of mono-olefins is treated to remove in one integrated process, impurities boiling below the boiling point of the alcohol being purified, impurities boiling in the same range as the alcohol, and impurities boiling above the alcohol. The process is of special importance since it substantially completely removes unstable impurities which tend to undergo thermal decomposition during normal distillation operations and thus avoids the formation, during later purification operations, of volatile, malodorous impurities boiling below the alcohol.

This invention provides an effective process in which both alcohol soluble and alcohol and water insoluble impurities, including particularly odor-producing and potential odor-producing contaminants, are removed from alcohols produced by the hydration of olefins. The process of this invention is especially useful for the production of high quality, substantially odorless ethanol.

The invention provides an improved process for the refining and purification of crude ethanol obtained by the catalyzed hydration of ethylene in which the crude ethanol is subjected to a selective extraction which removes substantial portions of the high boiling impurities, particularly those which are thermally unstable and which, if present, undergo decomposition and degradation upon heating and thus produce malodorous products boiling below ethanol during subsequent processing operations. This extraction serves to remove higher boiling impurities which are not completely removed by water extractive distillation.

A preliminary distillation is also preferable to remove, as an overhead stream, the lower boiling impurities and particularly by-product diethyl ether. Remaining higher boiling impurities are subsequently separated by a water extractive distillation of the partially purified aqueous alcohol. Following the water extractive distillation step, the purified dilute aqueous alcohol is subjected to final rectification from which concentrated alcohol is recovered. This ethanol is of highest quality, entirely free from malodorous, volatile contaminants. More specific details and features of the invention will become apparent from the description given below.

By the catalyzed hydration of olefins is meant those processes in which the mono-olefins are hydrated in the presence of a catalyst, including both the acid catalyzed processes wherein mono-olefins and mixtures thereof are hydrated in the presence of acids such as sulfuric acid, phosphoric acid, and benzenesulfonic acid, and those processes, of the direct hydration type, in which the olefin is hydrated in the presence of solid catalysts such as supported phosphoric acid catalysts, phosphoric acid-tungsten oxide and the like. The most common commercial process is one in which ethylene is absorbed in strong sulfuric acid to yield an absorbate containing monoethyl sulfate and diethyl sulfate esters. Said absorbate is diluted and hydrolyzed, and a crude aqueous ethanol mixture is separated therefrom.

Operating according to the process of this invention, excellent yields of highest quality purified alcohol can be produced for use in industries requiring odor-free solvents. These include extensive uses in the cosmetic, perfume, drug, biological and vitamin industries.

It is well known that alcohols produced by the above outlined methods, and especially those produced by the sulfuric acid hydration of olefins, possess to a more or less degree, a distinct and foreign odor, slightly penetrating and for the most part disagreeable. Although it is not intended to ascribe the disagreeable odor of these alcohols to the presence of any one or to any particular combination of chemical compounds, it is definitely known that the odors of the crude alcohols depend largely on the quality of the starting material, that is, the purity of the olefin stream employed in the olefin hydration operation. Likewise, the odor of a refined alcohol depends to a similar extent on the quality of the crude alcohol from which it is originally prepared. Thus, a rather wide range of variations in purity and odor characteristics is possible for synthetic ethanol products.

Olefin hydrocarbons, such as those produced by the cracking of mineral oils, kerosenes, petroleum residues, fuel oils, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the obnoxious odor of the crude alcohol. Although pure elemental sulfur itself has no odor, when it is present in combination with other elements, it produces powerful odoriferous agents. The bad odor of alcohols has also been at least partially attributed to the presence of the so-called polymer products of wide boiling range which are formed by side reactions during the acid catalyzed olefin hydration process. The odor of these polymerized products is further accentuated by the presence of any sulfur compounds contained therein, although the odor of some pure polymers is, by itself, somewhat unpleasant. It has been further demonstrated that obnoxious odors in some hydration alcohols can be directly attributed to the decomposition of these polymeric materials during subsequent distillation operations. It is also possible that the presence of traces of organic nitrogen compounds contributes to the odor of the crude alcohols.

In order to show the number and diversity of the impurities usually present in alcohols produced by catalyzed hydration processes, the following analysis is presented. This analysis was made on a sample of crude ethanol produced by the sulfuric acid hydration of ethylene, the proportions given being based on an anhydrous alcohol basis (water-free basis).

| | Weight percent |
|---|---|
| Ethanol | 88.0. |
| Ether | 11.25. |
| Ketones | Trace. |
| Hydrocarbons | 0.45. |
| Higher alcohols | Trace. |
| Sulfur compounds | 3 p. p. m. as sulfur. |
| Polymer materials | 0.30. |

A typical ASTM standard distillation of a sample of the polymer materials fraction, resulting from the production of ethanol by the sulfuric acid hydration of ethylene, is as follows:

| | Temp., °F |
|---|---|
| Initial boiling point | 211 |
| 5% | 412 |
| 10% | 419 |
| 20% | 428 |
| 30% | 435 |
| 40% | 441 |
| 50% | 450 |
| 60% | 459 |
| 70% | 469 |
| 80% | 490 |
| 90% | 512 |
| 95% | 545 |
| End point | 558 |
| Recovery—96%. | |

Thus, regardless of exact causes, it has been found that the crude ethanol produced by the sulfuric acid hydration of ethylene contains impurities which are peculiar to products from the hydration process, including water, ethers, ketones, other higher alcohols, hydrocarbons, sulfur and nitrogen compounds, and various polymer oils having more or less complex chemical structures.

Commercial crude aqueous ethanol resulting from the acid hydration of ethylene has been purified using several general processes. For instance, by one method the crude aqueous alcohol was diluted with additional water in an attempt to throw out of solution a portion of the water insoluble impurities. Any resulting layer of insoluble impurities was separated. The remaining aqueous alcohol was then subjected to a distillation in a rectification column, wherein some of the low boiling impurities, including the major portion of the ethers, and some of the light hydrocarbons were removed overhead. The aqueous alcohol bottoms fraction from this rectification column was sent to a second rectification column from which various fractions were removed either overhead or as side streams. The product alcohol itself was recovered as a side stream removed at a point a few plates from the top of the tower, or it can be recovered as an overhead stream. This type of purification operation has been shown to give unsatisfactory alcohol. It consistently gives final ethanol fractions having bad odor characteristics of more or less intensity depending on the composition and properties of the starting alcohol fraction.

It has also been suggested that the crude aqueous alcohol mixture containing the impurities as above described be subjected to an improved operation in which the crude aqueous ethanol fraction is fed to a water extractive distillation tower at an intermediate point, and in which controlled amounts of water are fed to the top of the tower or at a point near the top in sufficient quantity to reduce the concentration of ethanol in the internal liquid reflux to 2 to 60 weight percent. At these dilutions the volatility of certain of the water insoluble impurities including ethers, ketones, higher alcohols, low molecular weight hydrocarbons, and the higher boiling polymer oils is enhanced to facilitate their removal.

Certain of the above outlined impurities present, particularly the malodorous polymer oils having relatively high boiling ranges up to 480-660° F., are difficult, if not impossible, to remove completely by extractive distillation even in the presence of large amounts of water and the most favorable operating conditions.

In subsequent distillation operations, the dilute aqueous alcohol product recovered from the conventional purifying and refining operations but containing residual odoriferous impurities described above, is taken to a concentrating or rectifying column, wherein the alcohol is concentrated and recovered as an overhead fraction. It has been further found that the relatively high boiling impurities including particularly the polymer oils when introduced into the rectifying column even in small amounts, undergo thermal degradation and decomposition yielding low boiling polymer oils, sulfur containing materials, and partially oxygenated organic compounds. These lighter fractions have lower molecular weights and/or boiling ranges since they generally consist of fragments of heavier fractions. Because of these characteristics, they are readily carried over into the alcohol overhead fraction and are thus present in the finished, refined alcohol. Such impure alcohol has an obviously unpleasant odor and purified alcohol of desired odor characteristics cannot be thus obtained as a fraction from the upper portion of the rectifying column.

A sample of a fraction of oil recovered as a side stream from a rectifying column was studied to determine its behavior on heating both alone and in the presence of alcohol and water under thermal conditions typical of those normally existing in the rectifying zone wherein concentration is effected. A sample of polymer oil containing 350 p. p. m. of sulfur was added to refined alcohol and refluxed in a laboratory distillation column (180-200° F.—atm. pressure). A sample of alcohol drawn from the overhead shortly after refluxing was begun showed only a slight malodorous content. A sample of overhead drawn after 24 hours of refluxing was extremely malodorous and exhibited a sulfurous characteristic. The residual oil recovered from the charge was analyzed and showed only 285 p. p. m. of sulfur. This is clear evidence that substantial portions of the sulfur containing oil decomposed during the period of refluxing and that this decomposed, volatile material carried relatively large amounts of sulfur and malodorous impurities into the volatile overhead fraction.

A sample of polymer oil containing 350 p. p. m. of sulfur was distilled to dryness under vacuum (0.4 mm.) and yielded the following fractions at temperatures of from 175° to 225° F.:

| Fraction No. | Weight, gm. | Sulfur, p. p. m. |
|---|---|---|
| Cold trap | 2.6 | 722 |
| No. 1 | 6 | 210 |
| No. 2 | 12.8 | 154 |
| No. 3 | 14.3 | 144 |
| No. 4 | 4.2 | 526 |
| Residue | 1.6 | |

Thus, the volatile decomposition product collected in a Dry Ice cold trap located on the condenser vent contained the greatest concentration of sulfur. Although appreciable concentrations of sulfur were found in all fractions, the greatest amount, 722 p. p. m. sulfur found in the cold trap fraction represents volatile impurities produced by the thermal decomposition of the heavy sulfur containing polymer oils during the distillation. Such thermal decomposition causes the high sulfur content of the cold trap fraction, all of which is volatile and passes overhead with ethanol during distillation.

According to the improvements comprising this invention, a crude aqueous alcohol mixture containing from 0.1 to 2.0 weight percent polymer oils, is used as the original feed stream. This synthetic ethanol stream is produced by the hydration of an ethylene containing stream with sulfuric acid. Hydration of ethylene using sulfuric acid produced diethyl ether as a by-product in quantities of from 3 to 15 weight percent based on the amount of ethanol produced. Thus, all or substantial portions of this diethyl ether may be present, depending on whether or not the crude ethanol has previously been treated for removal of volatiles, including particularly, the diethyl ether. The crude alcohol mixture also contains varying amounts of water, for instance, from 12 to 60 percent by weight.

If ether is present in substantial amounts, it is preferably removed during the preliminary stages of the purification operations. This is necessary since the ether increases the solubility of the hydrocarbon oils in the aqueous alcohol and makes their extraction more difficult. Thus, the ether is removed substantially completely prior to the extraction. In accordance therewith, the alcohol containing stream is fed into a distillation tower. This distillation tower is operated at a superatmospheric pressure of 5 to 20 p. s. i. g. to facilitate condensation of ether. The temperature within the column is controlled such that the temperature at the top of the column is between 120° to 140° F., and at the bottom, between 200° and 220° F. The vapor stream from the upper portion of this ether removal column has the approximate composition of 98 weight percent ether, 1.5 weight percent water, together with traces of acetaldehyde and other low boiling impurities. This overhead fraction is condensed, and at least a portion removed as crude diethyl ether for further purification.

The bottoms stream containing substantially all the ethanol but substantially free of ether is subjected to a decanting or phase separation step to effect preliminary removal of substantially insoluble oils and other materials. In the phase separator, the alcohol containing stream may, if desired, be diluted with water to an approximate alcohol concentration of from 15 to 40 weight percent. The temperature in the decanter can vary from 25 to 225° F. An oil layer comprising any impurities insoluble and easily separable under the conditions of concentration of the components in the mixture separates and is removed as an upper layer. The aqueous, alcohol containing portion is withdrawn as a lower layer.

In some instances a preliminary filtration is desirable as when there are present finely divided and dispersed solids. These materials may act as colloid stabilizers and result in poor and unduly slow phase separations during subsequent decantation steps. Typical filtration materials for beds are high flow materials such as high silicate sand, cotton, muslin, ground glass, glass wool, and the like.

A countercurrent extraction zone is the preferred contacting device although cocurrent and batch extractions can be employed.

The solvent used for extraction should be inert to the components in the alcohol stream and should be readily removable therefrom during subsequent steps. Typical examples include aliphatic hydrocarbon solvents such as butane, propane, pentane, hexane, isooctane, kerosene, petroleum ether, mineral spirits, gasoline, cyclohexane, and the like. At room temperature, $C_5$ to $C_7$ aliphatic hydrocarbons either singly or in mixtures are preferred. It is highly desirable although not necessary to employ as the extractant a solvent which is volatile under the operating conditions of the extractive distillation column. Such operation is desirable both from an economic and a practical point of view. However, the use of such highly volatile solvents such as pentane and the like requires that the entire purification operations be carried out under pressure or that cooling be applied. Preferably, the hydrocarbon solvent should boil in the range of from about 50° C. up to about 180° C.

The maximum of alcohol concentration from which satisfactory extractions of oil can be made is about 50 wt. percent. Preferably, the alcohol concentration is 30–40 wt. percent to facilitate phase separation and decrease mutual solubility of the two phases. Temperatures of approximately 10° C. to 50° C. or even higher up to, but not exceeding the boiling point of the mixture at atmospheric pressure are best used in the extraction step. For practical reasons, a maximum percentage extractant of about 20% by weight is preferred, although relative amounts of from 1% up to 50% can be employed. The exact conditions, including temperatures, extractant, percentage, time and method of contact, and the like are best finally selected on the basis of the exact composition of the polymeric oils and on the proof of the alcohol extracted.

The crude aqueous alcohol stream which is relatively free of ether, and also free of all thermally unstable, polymeric oils which tend to decompose during final rectification operations, and which is obtained as a result of these preliminary refining operations is then subjected to a water extractive distillation operation.

The ethanol containing mixture is fed to an intermediate point of a rectification tower. Sufficient water is added at the top of the tower, or at a point above the feed plate to reduce the concentration of ethanol in the internal reflux to 5 to 40 weight percent and preferably to 10 to 30 weight percent. The water present in the extractive distillation raises the active boiling temperature on the trays and causes the passage upward in the column of the volatile organic impurities remaining in the alcohol. There is consequently produced as a bottoms stream an aqueous ethanol stream containing from 3 to 20 weight percent alcohol which is entirely free of malodorous impurities and also free of higher boiling materials which might undergo thermal degradation during subsequent concentration of the dilute alcohol.

For example, an aqueous bottoms stream of the following general composition has been obtained using the above outlined purification steps.

EXTRACTIVE DISTILLATION COLUMN BOTTOMS

Ethanol _____ 3.0 to 15.0 weight percent.
Polymer oils _____ Less than 0.002 weight percent.
Water _____ Remainder.

This weak alcohol fraction is next subjected to concentration in a rectifying column. The temperature within the column will range from about 220° F. at the base to about 175° F. at the top of the column at atmospheric pressure. Since essentially all of the malodorous impurities and all of the higher boiling materials which otherwise, if present, undergo decomposition and degradation to lower boiling, more volatile materials have been previously removed, a pure 95 percent alcohol stream is recovered as an overhead fraction or as a top side stream from the rectifying column. The purified alcohol products so obtained have an acidity no greater than 0.001, an APHA color of less than 5, permanganate time greater than 60, and no detectable foreign odors.

*Example 1.*—The accompanying figure represents a flow plan in elevation of the process and shows typical apparatus for carrying out the process of this invention.

The approximate composition of the crude ethanol feed which is fed to the purification system is as follows:

|  | Percent |
|---|---|
| Ether | 3–15 |
| Oil | 0.1–2.0 |
| Alcohol | 40–70 |
| Water | 56.9–13 |

The ether may or may not be present in the crude feed to the purification system. If it has previously been removed, then the ether removal column 4 may be omitted.

The crude feed in line 1 is heated to about 200° F. in preheater 2 and fed continuously by line 3 into an intermediate point of ether removal column 4, a rectifying column of approximately 40 trays. Heat is supplied to the base of column 4 by live steam line 10 or, alternatively, by a closed steam coil and continuous fractional distillation of the crude ethanol feed is thereby effected. Column 4 is generally operated at 5–30 p. s. i. g. pressure to facilitate condensation of the ether vapor although it can be operated at atmospheric pressure. The temperature at the bottom of column 4 is maintained at about 190°–230° F. Vapor boiling overhead from column 4 is removed through overhead line 5. The temperature at the top of column 4 is about 105°–150° F. The vapor in line 5 is passed to condenser 6. The condensate from condenser 6 is predominately diethyl ether with some volatile impurities including low boiling polymer oils and water and a small amount of ethanol. This ether stream is removed via line 7. A major part of this stream is returned via line 8 to provide refluxing liquid for column 4. The remaining portion is withdrawn by line 9 as crude diethyl ether product which may be further purified and refined as desired.

Some of the polymer oil impurities present in the crude ethanol feed, particularly those which are more volatile than ethanol in the presence of aqueous ethanol solution, may accumulate in column 4 as a non-aqueous phase at a point near or slightly above the feed point. These impurities are withdrawn from column 4. Dilute ethanol stripped of its more volatile impurities, particularly the predominant impurity diethyl ether, is withdrawn from the base of column 4 through line 11.

The aqueous ethanol stream withdrawn through line 11 and containing essentially all of the ethanol is passed into decanter 12. As desired, water can be added to decanter 12. Preferably, the ethanol concentration is adjusted to about 30–45 weight percent or to a concentration at which certain hydrocarbon oil impurities become insoluble. This insoluble phase is removed via line 13. The diluted ethanol containing phase is passed from the decanter by line 14 and is preferably pumped through a heat exchanger. A hydrocarbon extracting solvent may be introduced into the ethanol containing stream in line 15 via line 16 but this is not necessary. The alcohol containing stream which is partially freed of polymeric, higher molecular weight oil impurities is passed from the heat exchanger by line 17 into the upper portion of extraction tower 18. A stream of extracting hydrocarbon solvent is introduced into the lower portion of the extraction tower via inlet line 31. The alcohol stream flows downward countercurrent to the hydrocarbon extractant. The aqueous alcohol raffinate stream substantially free of thermally unstable polymeric oils is removed from the lower portion of column 18 via line 32.

The hydrocarbon extractant containing polymeric oils and impurities including those which tend to undergo decomposition during subsequent rectification operations, is removed via line 19 and passed into the mid portion of stripper column 20. Column 20 is heated and the temperature controlled to strip the hydrocarbon from the polymer oil. Bottoms are removed via line 26. A part is passed by line 27 to reboiler 29 and returned to the column by line 30. A part of the bottoms consisting predominantly of extracted polymeric oil is removed for further disposal by line 28. The stripped extractant is passed from the upper portion of column 20 by line 21 to reflux condenser 22. The condensate is removed and a part refluxed to stripper column 20 via line 24. A part of the condensate is returned to extraction tower 18 via recycle lines 23 and 25 and inlet line 31.

The partially refined alcohol stream from the extraction tower 18 is passed via line 32 into extractive distillation column 33. This column is preferably a distillation tower of about 45 plates and feed line 32 is positioned at or near the midpoint. Dilution water is introduced into column 33 via line 34 at a point above the feed point, either at or near the top. Continuous extractive distillation is conducted in column 33. The water is introduced via line 34 in such amounts to effect dilution and to modify and increase the volatilities of the organic compounds, particularly the remaining polymer oil impurities such that they can be readily removed from the alcohol by distillation. This water may be pure water or it can be an aqueous stream which is recycled from the bottom of the alcohol rectification column.

The feed to column 33 is preferably preheated, prior to introduction, to a temperature at or near that of the internal liquid reflux under equilibrium conditions of the tray located at the introduction position. The column is operated with continuous introduction of alcohol feed, continuous introduction of water above the feed, and with sufficient heat provided to effect distillation throughout the column. The amount of water added is sufficient to reduce the ethanol concentration to 10 to 40 weight percent, and preferably 15 to 30 weight percent in the internal reflux. Operating thus, the purified aqueous ethanol fraction recovered as the bottoms stream is dissolved in and carried downward in the aqueous internal reflux. Steam is introduced into the base of column 33 through line 35 or, alternatively, heat may be supplied to column 33 by means of a closed heating coil. Overhead vapors boiling from column 33 are carried by line 36 to condenser 37. Condensed vapors are removed from condenser 37 by line 38 and passed to decanter 39.

Any lighter oil impurities which are fed into column 33 are removed in the overhead stream via line 36 and passed to condenser 37. The resulting condensate is then passed to decanter 39. By using sufficient dilution water in column 33 oil impurities distilled from column 33 form an upper oil phase in decanter 39 and are withdrawn through line 40 for further treatment. The lower aqueous phase from decanter 39 is returned to column 33 as reflux through line 42, or alternatively, may be partially or totally withdrawn through line 41 as an overhead aqueous stream to remove any water soluble impurities present.

Bottoms product stream from column 33 containing the predominant part of the original ethanol in dilute aqueous solution of about 5 to 30 weight percent and essentially free of all of its original impurities is withdrawn via line 43. This dilute ethanol stream is entirely free of the thermally unstable impurities and can be subjected to concentration by rectification without formation of decomposition products. Bottoms stream 43 is passed to a pump discharging through line 45 to rectifying column 46 having 60–70 trays. Heat is supplied to the base of column 46 through steam line 55 or alternatively it is supplied through a closed heating coil or by means of a reboiler. In column 46 the purified aqueous alcohol is concentrated to the required proof. Vapors boiling overhead from column 46 which consist of highly refined ethanol are passed by line 47 to condenser 48. The top temperature of the column is about 180° F. Condensed purified ethanol is withdrawn from condenser 48 through line 49. A part of the condensate is refluxed to the top of column 46 through line 51. Highly refined product alcohol having no detectable foreign odor is withdrawn through line 50 or, alternatively, the product is withdrawn as a side stream from a point near the top of column 46, to prevent contamination of the product alcohol during periods of improper operation. When so operating, a small stream is withdrawn from condenser 48 through lines 49 and 50 and recycled to extractive distillation column 33.

Any heavy oils which have not previously been completely removed may accumulate above the feed tray of column 46 and are withdrawn at or slightly above the feed plate through side connections 53 and pipe 54 for further processing. Water substantially free of alcohol is withdrawn from the base of column 46 through line 56.

This aqueous bottoms stream may also, if desired, be partially or totally recycled to extractive distillation column 33 and added via line 34.

The purified ethanol obtained thusly has been subjected to analysis by distillation and the fractions carefully examined for odor characteristics. These data show that the alcohol is of highest quality and entirely odor free.

*Example II.*—Analytical and extraction studies have been carried out on various of the polymer oil fractions. One such study was made on the polymer oils obtained from the rectifying column. Approximately 95% of this material was found to be a mixture of saturated and unsaturated, highly branched hydrocarbons containing about 10 to 16 carbon atoms. The other 5% is a complex mixture of unsaturated aldehydes and/or ketones and traces of sulfur compounds.

In another series of tests to study the properties of the mixture of polymeric oils, a portion of the original oil was roughly vacuum fractionated. The bulk of the oil (88%) distilled between 104 and 172° C. at 50 mm. pressure. The refractive indices of these fractions ranged from 1.4654 to 1.4983 for the D line of sodium at 25° C. Fraction No. 4 (B.P.$_{50}$ 126–130°) was chosen for solubility studies.

FRACTION NO. 4

B.P.$_{50}$: 126–130° C.     D$_{25}$: 0.828
$n_D^{25}$ 1.4654     M.W.: 181±5

The series of extractions carried out on fraction No. 4 in various proof alcohol samples using hydrocarbon solvents yielded the following results in Table 1, indicating that extraction to remove polymeric, malodorous oil is entirely practical.

TABLE 1
[Boiling range 126–130° C. at 50 mm.]

| Extraction No. | Alcohol, wt. Percent | Solvent | Percent Solvent | Percent Oil | Percent Oil Remaining | Temp., °C. |
|---|---|---|---|---|---|---|
| 1 | 44.4 | Decane | 15.0 | 2.9 | 2.0 | 25 |
| 2 | 44.4 | Heptane | 16.2 | 2.2 | 0.1 | 25 |
| 3 | 43.0 | Mineral Spirits [1] | 16.2 | 2.2 | 0.13 | 70 |
| 4 | 43.0 | ....do.... | 5.0 | 0.13 | 0.014 | [2] 70 |
| 5 | 41.3 | ....do.... | 10.0 | 0.22 | 0.061 | 70 |
| 6 | 41.3 | ....do.... | 5.0 | 0.21 | 0.075 | 70 |
| 7 | 41.3 | ....do.... | 5.0 | 0.075 | 0.036 | [3] 70 |

[1] C$_8$–C$_9$ aliphatic hydrocarbon fraction, with a boiling range of 113 to 144° C., 90% of which boils between 118 to 137° C.
[2] Oil remaining in #3 extracted (re-extracted).
[3] Oil remaining in #6 extracted (re-extracted).

*Example III.*—Other experiments were carried out to study the variables of the extraction operation and their effect on extraction of undesirable oils from the alcohol obtained as ether column bottoms. The data so obtained is presented in Table 2 below. A number of volatile solvents were tested for effectiveness.

TABLE 2

| Extraction No. | Conditions | | | Alcohol, wt. Percent | Oil, g./100 liters | | Oil Reduction, Percent |
| | Solvent | Temp., °F. | Wt. Percent Extractant | | Original | Treated | |
|---|---|---|---|---|---|---|---|
| 8 | Pentane | 75 | 50 | 50.2 | 208 | 7 | 96.7 |
| 9 | ....do.... | 75 | 50 | 37.9 | 173 | 4.5 | 97.4 |
| 10 | ....do.... | 75 | 10 | 37.9 | 173 | 7.5 | 95.7 |
| 11 | ....do.... | 75 | 10 | 37.9 | 163.2 | 8.9 | 94.6 |
| 12 | ....do.... | 75 | 1 | 37.6 | 164.6 | 15.8 | 90.4 |
| 13 | ....do.... | 75 | 5 | 37.6 | 164.6 | 10.4 | 93.7 |
| 14 | ....do.... | 75 | 10 | 37.6 | 164.6 | 7.7 | 95.3 |
| 15 | ....do.... | 75 | 20 | 37.6 | 164.6 | 8.2 | 95.0 |
| 16 | ....do.... | 75 | 50 | 37.6 | 164.6 | 5.8 | 96.5 |
| 17 | Original, settling only, ½ hour | | | 37.6 | 164.6 | 30.4 | 81.5 |
| 18 | Pentane | 75 | 10 | 37.9 | 143.6 | 9.0 | 93.8 |
| 19 | ....do.... | 75 | 50 | 37.9 | 143.6 | 6.4 | 95.5 |
| 20 | ....do.... | 75 | 50 | 31.8 | 113 | 6.8 | 94.0 |
| 21 | ....do.... | 75 | 50 | 29.9 | 109 | 6.0 | 94.5 |
| 22 | ....do.... | 150 | 10 | 38.8 | 456 | 157.0 | 65.6 |
| 23 | Hexane | 150 | 10 | 38.8 | 456 | 150.0 | 67.1 |
| 24 | Pentane | 75 | 10 | 40.8 | 398 | 164.0 | 58.8 |
| 25 | ....do.... | 75 | 10 | 29.9 | 298 | 119 | 60.1 |
| 26 | ....do.... | 75 | 10 | 19.7 | 216 | 74 | 65.7 |
| 27 | ....do.... | 75 | 10 | 9.7 | 125 | 37 | 70.4 |

While there are above disclosed but a limited number of embodiments of the process of the invention herein presented, it is possible to produce still other embodiments without departing from the inventive concept therein disclosed, and it is desired therefore that only such limitations be imposed on the appended claim as are stated therein.

What is claimed is:

In a method for purifying and refining crude aqueous ethanol produced by the hydration of an ethylene containing stream, said crude ethanol containing both lower and higher boiling impurities, including diethyl ether and unstable polymeric oils which undergo decomposition under distillation conditions, which comprises the steps of continuously passing said crude aqueous ethanol into a fractional distillation zone, continuously removing from the upper portion of said zone a stream containing lower boiling impurities including substantially all of the diethyl ether and other impurities boiling below ethanol, removing from the lower portion of said zone an aqueous ethanol stream, continuously passing said aqueous ethanol stream into a fractional extractive distillation zone, continuously feeding water into said fractional extractive distillation zone at a point above the aqueous ethanol feed stream, maintaining an internal liquid reflux having an ethanol content of 5 to 40 weight per cent within the zone below the water feed point, continuously removing from the upper portion of said extractive distillation zone, a stream containing organic impurities including both lower and higher boiling materials, continuously removing from the lower portion of said extractive distillation zone a dilute aqueous ethanol stream, passing said aqueous ethanol to a concentrating, fractional distillation zone, and removing from an upper portion of said concentrating distillation zone a stream of concentrated ethanol, the improvement which comprises the steps of subjecting said aqueous ethanol stream recovered from said initial fractional distillation zone to preliminary extraction by contacting of said aqueous ethanol stream in an extraction zone with a volatile hydrocarbon extractant which is a selective solvent for said polymeric oils, continuously removing from said extraction zone an extract stream of said selective solvent containing substantially all of said polymeric oils, and continuously removing from said extraction zone a raffinate stream containing substantially all of the ethanol at a concentration of 30 to 40 weight percent based on total ethanol and water, and relatively free of higher boiling unstable polymeric oils which tend to undergo thermal decomposition to volatile, malodorous impurities during final rectification operations.

References Cited in the file of this patent

UNITED STATES PATENTS

| | | |
|---|---|---|
| 887,793 | Guillaume | May 19, 1908 |
| 1,713,346 | Merley | May 14, 1929 |
| 2,290,442 | Metzl | July 21, 1942 |
| 2,610,141 | Drout | Sept 9, 1952 |